US009378298B2

(12) United States Patent
Ivory et al.

(10) Patent No.: US 9,378,298 B2
(45) Date of Patent: Jun. 28, 2016

(54) USER INFLUENCED ASYNCHRONOUS MODULE DEFINITION LOADER

(71) Applicant: International Business Machines Corporation, Armonk, NY (US)

(72) Inventors: Andrew J. Ivory, Wake Forest, NC (US); Todd E. Kaplinger, Raleigh, NC (US); Aaron K. Shook, Raleigh, NC (US); David M. Stecher, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 14/066,720

(22) Filed: Oct. 30, 2013

(65) Prior Publication Data

US 2014/0250367 A1 Sep. 4, 2014

Related U.S. Application Data

(63) Continuation of application No. 13/784,029, filed on Mar. 4, 2013.

(51) Int. Cl.
*G06F 17/00* (2006.01)
*G06F 17/30* (2006.01)
*G06F 17/22* (2006.01)

(52) U.S. Cl.
CPC ...... *G06F 17/30899* (2013.01); *G06F 17/2247* (2013.01)

(58) Field of Classification Search
CPC .............. G06F 17/2247; G06F 17/30899
USPC .......................... 715/204, 234, 253
See application file for complete search history.

(56) References Cited

U.S. PATENT DOCUMENTS

| 6,779,119 | B1* | 8/2004 | Moshfeghi ........ G06F 17/30132 707/999.002 |
| 2002/0111973 | A1* | 8/2002 | Maddalozzo, Jr. .................... G06F 17/30899 715/201 |
| 2006/0259585 | A1* | 11/2006 | Keohane ........... G06F 17/30899 709/219 |
| 2008/0235339 | A1* | 9/2008 | Lurey et al. .................... 709/206 |
| 2011/0022984 | A1* | 1/2011 | van der Meulen .. G06F 9/44526 715/830 |

(Continued)

OTHER PUBLICATIONS

International Search Report and Written Opinion for International Application No. PCT/CA2014/050068; International Filing Date: Feb. 3, 2014; Date of Mailing: Jul. 3, 2014, 8 pages.

(Continued)

*Primary Examiner* — Stephen Hong
*Assistant Examiner* — Matthew Ludwig
(74) *Attorney, Agent, or Firm* — Cantor Colburn LLP; Radin Uddin

(57) ABSTRACT

Embodiments relate to prioritizing the loading of a portion of a web page based on a user designation. An aspect includes providing a user interface for controlling page loading. A user selection of a portion of a web page is received at a server for priority loading. Accordingly, the loading of the portion of the web page is then prioritized based on the user selection. Embodiments further disclose measuring page loading analytics for a plurality of users. The loading of a portion of a web page may be prioritized based on the measured page loading analytics for the plurality of users. Responsive to subsequent page accesses from one of the plurality of users, the prioritized portion of the page is loaded.

5 Claims, 4 Drawing Sheets

(56) References Cited

U.S. PATENT DOCUMENTS

| | | |
|---|---|---|
| 2011/0029641 A1 | 2/2011 | Fainberg et al. |
| 2012/0066586 A1 | 3/2012 | Shemesh |
| 2012/0102402 A1 | 4/2012 | Kwong |
| 2012/0144288 A1* | 6/2012 | Caruso ............ G06F 17/30905 715/234 |
| 2012/0159311 A1 | 6/2012 | Hanssen et al. |
| 2012/0194519 A1 | 8/2012 | Bissell et al. |
| 2012/0290977 A1 | 11/2012 | Devecka |
| 2012/0331375 A1 | 12/2012 | Fanning et al. |
| 2014/0026039 A1 | 1/2014 | Lundgren et al. |

OTHER PUBLICATIONS

IBM, "Method and Apparatus for Adaptively Loading Web Content Oriented by User Behavior at Client-side," IP.com No. IPCOM000184979D, Jul. 7, 2009, 8 pages.

* cited by examiner

USER INFLUENCED ASYNCHRONOUS MODULE DEFINITION LOADER

CROSS-REFERENCE TO RELATED APPLICATION

This application is a continuation of U.S. patent application Ser. No. 13/784,029, filed Mar. 4, 2013, the content of which is incorporated by reference herein in its entirety.

BACKGROUND

The present invention relates generally to web browsing, and more specifically, to prioritizing the loading of a portion of a web page based on a user designation.

The World Wide Web (WWW) is a system of interlinked hypertext documents accessed via the Internet. With a web browser, a user may view web pages containing elements including text, images, videos, and other multimedia, and navigate between them via hyperlinks. Each web page is specified by a Uniform Resource Locator (URL) address which comprises an access protocol designation such as "http" as a prefix, a server name, and the requested document as a suffix. The server name typically includes a "domain name" which may be the name of a company, educational institution, government body, or other organization that maintains the server. The request indicates a web page associated with the server.

Typically, the size and complexity of a requested web page affects the display speed of the requested web page. Moreover, the processing and variable connection speeds of a requesting web browsing device can also affect the display speed of the requested web page. Consequently, complex web pages loaded on web browsing devices with slow processors, low memory, and/or slow connection speeds may delay the time it takes for all elements of a web page to display.

BRIEF SUMMARY

According to an embodiment of the present invention, a method for prioritizing the loading of a portion of a web page based on a user designation is provided. The method includes providing a user interface to control page loading by a processing device. A user selection of a portion of a web page is received at a server for priority loading. According to embodiments, the loading of the portion of the web page is then prioritized based on the user selection.

According to another embodiment of the present invention, a system for prioritizing the loading of a portion of a web page based on a user designation is provided. The system includes a computer processor and logic executable by the computer processor. The logic is configured to implement a method. The method includes providing a user interface to control page loading by a processing device. A user selection of a portion of a web page is received at a server for priority loading. According to embodiments, the loading of the portion of the web page is then prioritized based on the user selection.

According to a further embodiment of the present invention, a computer program product for prioritizing the loading of a portion of a web page based on a user designation is provided. The computer program product includes a storage medium having computer-readable program code embodied thereon, which when executed by a computer processor, causes the computer processor to implement a method. The method includes providing a user interface to control page loading by a processing device. A user selection of a portion of a web page is received at a server for priority loading. According to embodiments, the loading of the portion of the web page is then prioritized based on the user selection.

According to an embodiment of the present invention, a method for prioritizing the loading of a portion of a web page based social analytics is provided. The method includes measuring page loading analytics for a plurality of users. The loading of a portion of a web page may be prioritized based on the measured page loading analytics for the plurality of users. Responsive to subsequent page accesses from one of the plurality of users, the prioritized portion of the page is loaded according to embodiments.

According to another embodiment of the present invention, a system for prioritizing the loading of a portion of a web page based social analytics is provided. The system includes a computer processor and logic executable by the computer processor. The logic is configured to implement a method. The method includes measuring page loading analytics for a plurality of users. The loading of a portion of a web page may be prioritized based on the measured page loading analytics for the plurality of users. Responsive to subsequent page accesses from one of the plurality of users, the prioritized portion of the page is loaded according to embodiments.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to prioritizing the loading of a portion of a web page based on a user designation. Embodiments provide a user interface for controlling page loading from a server. A user selects of a portion of a page on the user interface for priority loading from the server. According to embodiments, the portion of the page selected by the user is loaded first (or is otherwise given priority over the loading of other portions of the page) by the server when the user subsequently accesses the webpage.

Embodiments disclosed herein provide the user with the ability to dynamically prioritize which sections of a webpage they are interested in viewing first. For example, the user may only care about the weather section of a web site. Due to a slow connection or processor speed, however, the user may have to wait for the entire web page to load before the user can actually see the weather information they are interested in. Accordingly, embodiments disclosed herein are directed to prioritizing the loading of a portion of a web page based on a user designation.

It is understood in advance that although this disclosure includes a detailed description on a particular computing environment, implementation of the teachings recited herein are not limited to the depicted computing environment. Rather, embodiments are capable of being implemented in conjunction with any other type of computing environment now known or later developed (e.g., any client-server model, cloud-computing model, etc.).

Figure 1:
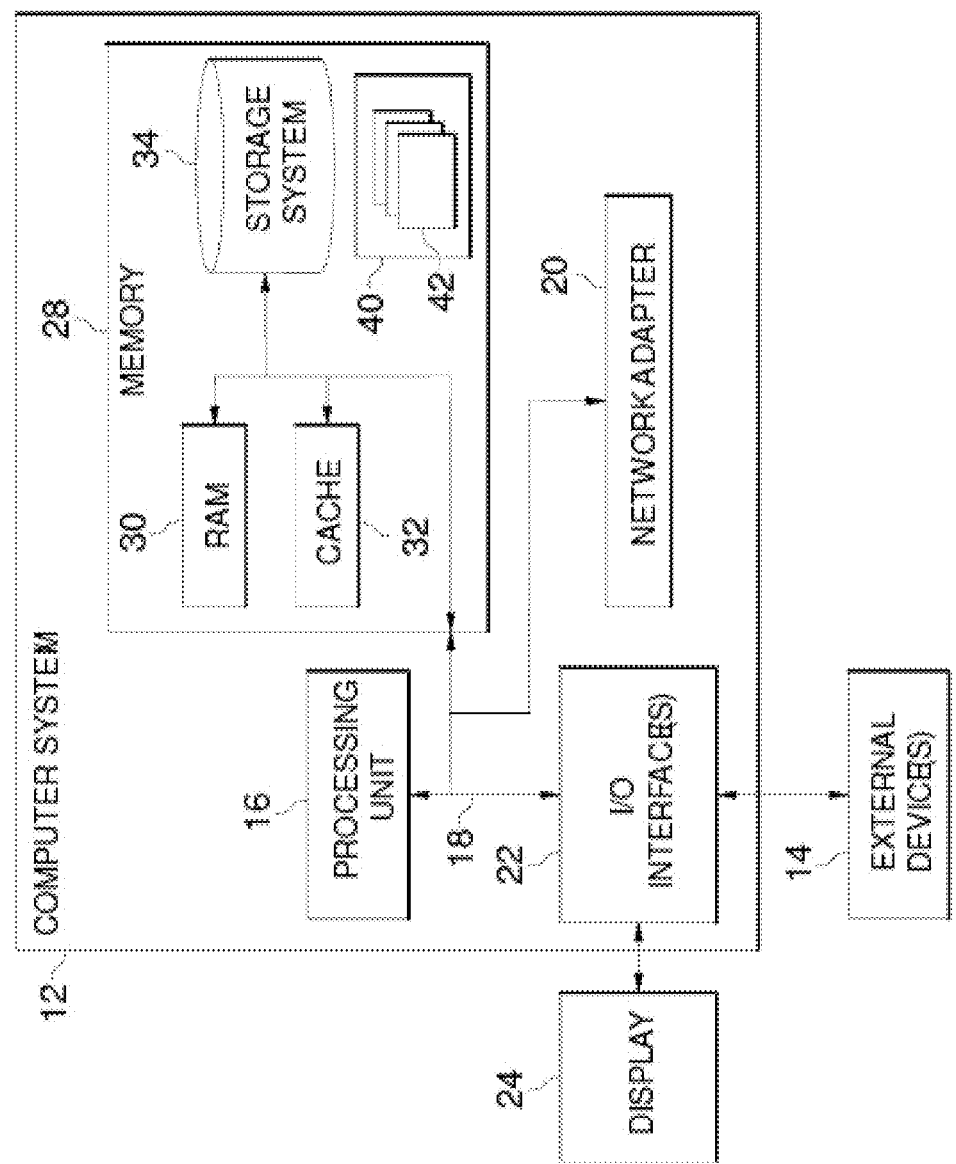
FIG. 1 depicts a computer system according to an embodiment.

Referring now to FIG. 1, a schematic of a computer system 12 is shown. The computer system 12 is only one example of a suitable computer system and is not intended to suggest any limitation as to the scope of use or functionality of embodiments of the invention described herein. Computer system 12 is capable of performing any of the functionality set forth herein.

The computer system 12 is operational with numerous other general purpose or special purpose computing systems or configurations. Examples of well-known computing systems, environments, and/or configurations that may be suitable for use with the computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by one or more processors of the computer system 12. Generally, program modules may include routines, programs, objects, components, logic, data structures, and so on that perform particular tasks or implement particular abstract data types. Computer system 12 may be practiced in distributed computing environments, such as cloud computing environments, where tasks are performed by remote processing devices that are linked through a communications network. In a distributed cloud computing environment, program modules may be located in both local and remote computer system storage media including memory storage devices.

As shown in FIG. 1, is the components of computer system 12 may include, but are not limited to, one or more computer processing devices 16, a system memory 28, and a bus 18 that couples various system components including system memory 28 to processing device 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 54, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
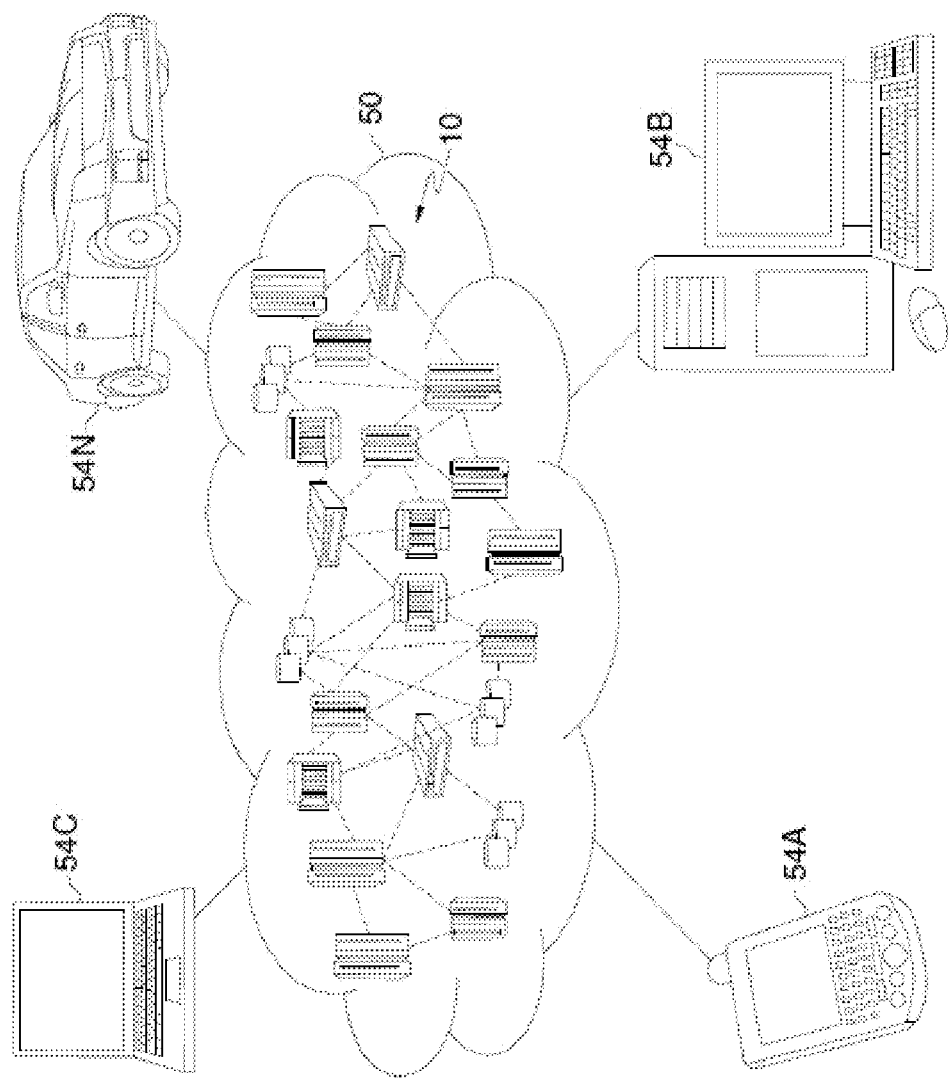
FIG. 2 depicts a network environment according to an embodiment.

Referring now to FIG. 2, a cloud computing network 50 comprises computer nodes 10, with which various local computing devices can communicate. For example, as shown in FIG. 2, computing devices 54 include a personal digital assistant (PDA) or cellular telephone 54A, a desktop computer 54B, a laptop computer 54C, and/or automobile computer system 54N. Additionally, nodes 10 (e.g., various servers, routers, switches, hubs, and links communicate with one another via the cloud computing network 50. They may be grouped (not shown) physically or virtually, in one or more networks, such as Private, Community, Public, or Hybrid clouds, or a combination thereof. This allows cloud computing network 50 to offer infrastructure, platforms and/or software as services that may be accessible using web browsers 100A, 100B, 100C, and/or 100N on computer devices 54A-54N, respectively, as well as other applications or modules. It is understood that the types of computer devices 54A-54N shown in FIG. 2 are intended to be illustrative only and the computer devices 54 can be embodied in any type of computerized device over any type of network and/or network addressable connection.

Figure 3:
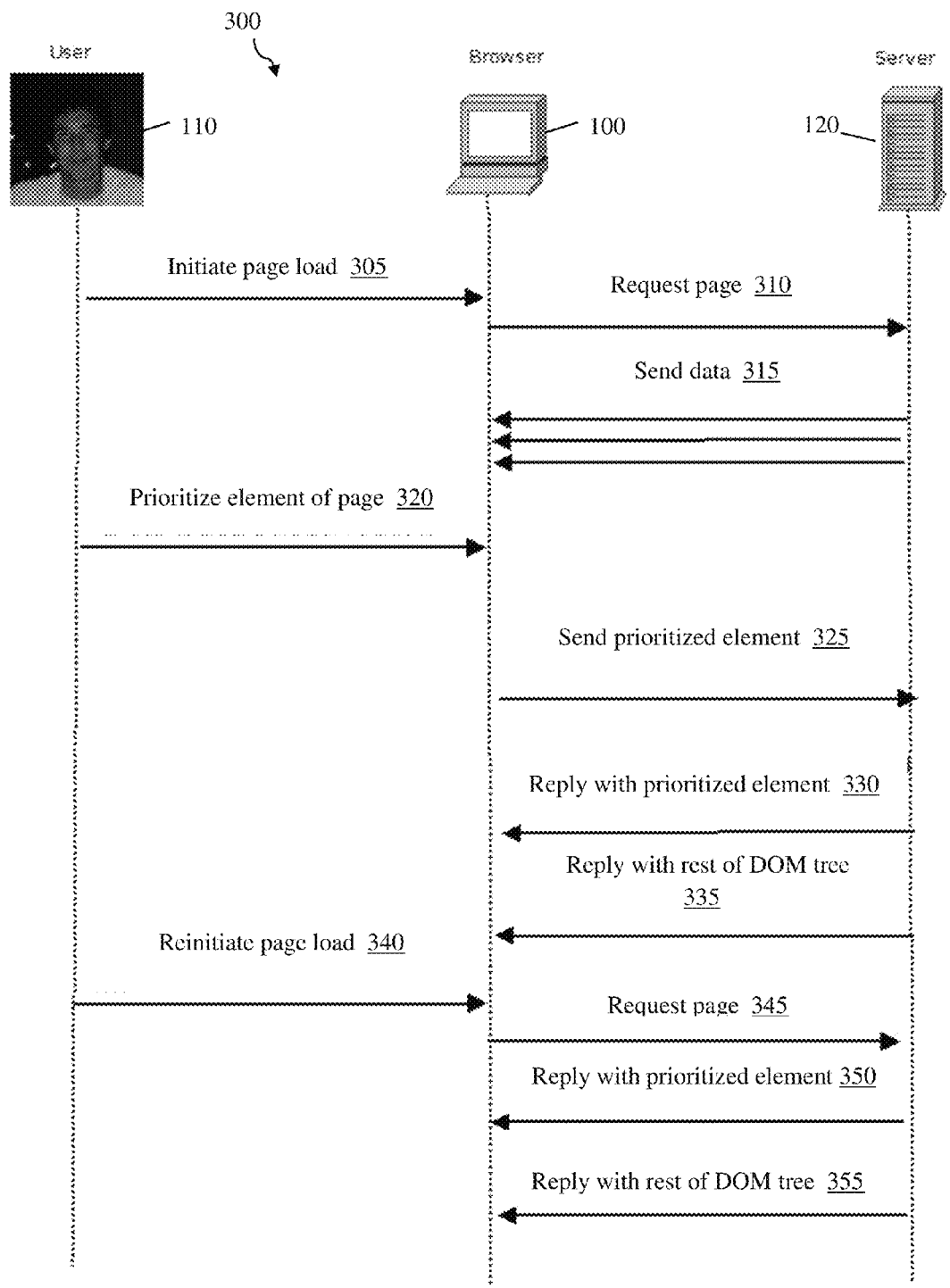
FIG. 3 depicts an operation for prioritizing the loading of a portion of a web page based on a user designation according to an embodiment.

With reference now to FIG. 3, an operation 300 for prioritizing the loading of a portion of a web page based on a user designation in accordance with an embodiment is shown. According to an embodiment, the operation 300 is configured to enable a user 110, via a computer device 54, to influence the load priority of a given portion of a web page through a function, such as a mouse interaction or a touch screen gesture. A server 120 illustrated in FIG. 3, and described herein, represents the computer system 12 of FIG. 1.

As shown in operation 305, the server 120 is configured to enable the user 110 to initiate a web page load from browser 100 implemented by computer device 54. At operation 310, the request for the web page may be issued to the server 120 through a loader according to an embodiment. For example, the loader may be in a known Asynchronous Module Definition (AMD) format for defining reusable modules that can be used across different frameworks. AMD provides a way to define modules such that they could be loaded asynchronously using a native browser script element-based mechanism.

The server 120 then begins to asynchronously send data back to the browser 100, as shown in operation 315. Accordingly, the web page of an embodiment begins to gradually load portions of a web page. For example, a typical DOM loading priority may load web page elements from top to the bottom. In an embodiment, the portions of the web page may include document object model (DOM) elements.

While the web page is loading, the user 110 may begin to navigate the web page. At operation 320, the user 110 may encounter a portion of the web page load that he is interested in prioritizing for download. According to an embodiment, the user 110 may subsequently indicate his interest in the portion of the web page by a preset function, such as drawing an outline around the DOM element. The DOM element selected by the user 110, which may not have all content under it loaded yet, may be highlighted according to an embodiment. For example, a user interface (UI) may shadow the DOM element of the web page in response to a user selection. According to one embodiment, the user 110 may indicate an element using a predefined hot key combined with mouse scroll-over. According to another embodiment, the user 110 may indicate an element by a predefined gesture on a touch screen of a web browsing device 54A-54N.

According to another embodiment, the user 110 may prioritize multiple portions or DOM elements on the loading web page. The UI of an embodiment may provide an interface that allows a user 110 to prioritize multiple portions or DOM elements on the web page. For example, the UI may include, but is not limited to, a side panel that indicates the ordering of user scrolling or gestures to indicate priority for each portion of the web page.

At operation 325, the browser 100 stores the user-selected DOM element associated with the loading web page and sends the DOM element back to the server 120. That is, as the user 110 makes his selection, the DOM element that the user 110 selected is transmitted back to the server 120 according to an embodiment.

At operation 330, after completing all in-flight requests (e.g., prerequisite reference calls), the server 120 of an embodiment reorders the requests it has received according to the priority set by the user 110 in operation 320. According to an embodiment, after reordering the asynchronous requests according to the user-designated priority, the server 120 replies to the browser 100 with the user-selected DOM element and its children (e.g., tags within the scope of an open and closing tag of the user-selected DOM element). After transmitting the prioritized DOM element, the server 120 transmits the rest of the elements in the DOM structure of the web page according to an embodiment, as shown in operation 335.

At operation 340, in the course of future internet browsing, the user 110 may return to the web page that the user 110 had previously set priorities for according to an embodiment. Accordingly, at operation 345, the browser 100 issues a request for the web page containing the cached DOM element that the user 110 wishes to view to the server 120. At operation 350, the server 120 first responds with the previously prioritized DOM element and its children according to an embodiment. Once this information has been transferred to the browser 100, the rest of the elements in the DOM tree are sent, as shown in operation 355. Accordingly, the user 110 receives the prioritized web page element more rapidly than other web page elements according to an embodiment.

According to an embodiment, the user's preferences may be stored by the browser 100 associated with each given web page for which the user 110 has specified a priority preference. The user 110 could select whether or not they wish to leverage these saved preferences via user settings according to an embodiment. Thus, when the user 110 returns to a given web page, the user 110 will not have to make the mouse scroll-over or gesture again. However, if the user 110 scrolls-over or gestures at a different element on a subsequent web page load, that element may in turn be given priority when the web page is subsequently loaded.

Figure 4:
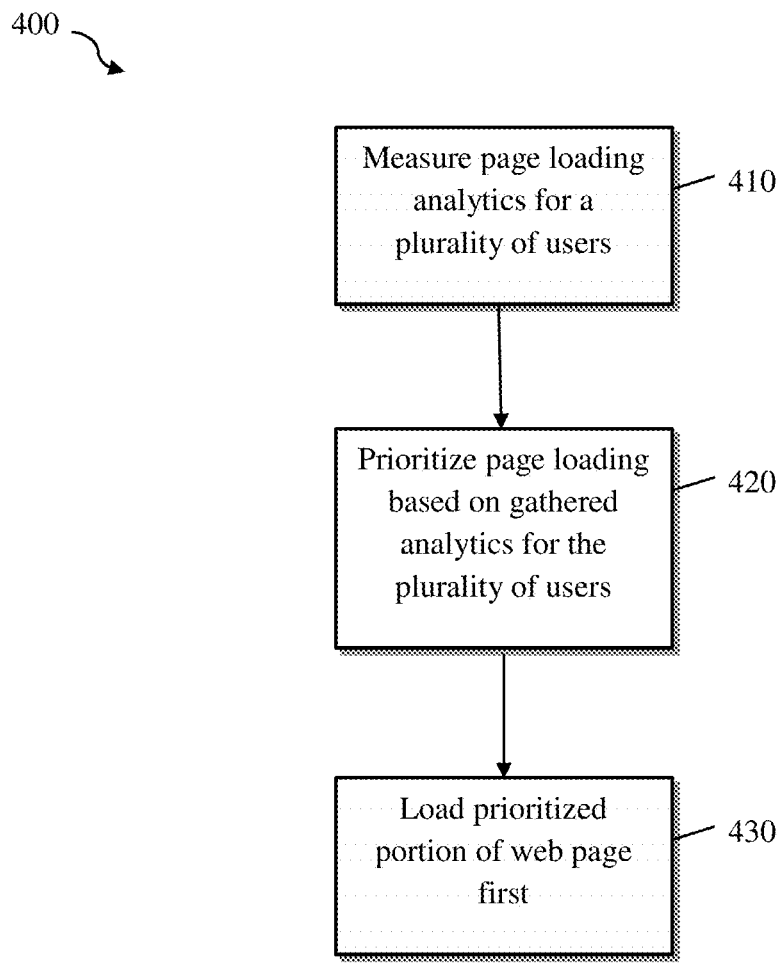
FIG. 4 depicts an operation for prioritizing portions of a web page based on page loading analytics according to an embodiment.

Referring to FIG. 4, an operation 400 for prioritizing portions of a web page based on page loading analytics according to another embodiment is shown. As shown in block 410, page loading analytics may be measured for a plurality of users to provide a social aspect to influence future web page loads. The plurality of users may belong to the same social network. At block 420, the loading of a portion of a page from a server is prioritized based on the measured page loading analytics for the plurality of users. For example, historical analytical information of an embodiment may indicate that a majority of users in a social network may have scrolled-over or gestured the same portion of the web page to indicate a prioritization preference. The portion of the page may be a DOM element according to an embodiment. Responsive to subsequent page accesses from one of the plurality of users, the portion of the page that has been prioritized by a majority of users in the social network will be loaded first, as shown in block 430.

Embodiments disclosed herein are directed to prioritizing the loading of a portion of a web page based on a user designation. Embodiments provide a user interface for controlling page loading by a processing device. A user selection of a portion of a web page is received at a server for priority loading. According to embodiments, the loading of the portion of the web page is then prioritized based on the user selection.

Embodiments further disclose measuring, by a processing device of a server computer, page loading analytics for a plurality of users. The loading of a portion of a web page may be prioritized based on the measured page loading analytics for the plurality of users. Responsive to subsequent page accesses from one of the plurality of users, the prioritized portion of the page is loaded according to embodiments.

Technical effects and benefits of embodiments disclosed herein include expediting the availability of web page information desired by a user. According to embodiments disclosed herein, users are provided with the ability to dynamically designate a page area to prioritize using a mouse click or scroll-over or touchscreen gesture. Moreover, the user's loader preferences associated with given web pages may be stored so that this knowledge can be recalled and leveraged on the next web page load.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
  receiving, by a server computer comprising a processor and a memory, a request for a web page, the request being sent from a user via a browser;
  sending, by the server computer, a subset of a plurality of document object model (DOM) elements of the web page to the browser, wherein the sending comprises processing a plurality of asynchronous data requests corresponding to the web page in an order that is based on a DOM loading priority of a DOM tree of the web page;
  receiving, at the server computer, a user selection of a DOM element of the subset of the plurality of DOM elements of the web page for priority loading after sending the subset of the plurality of DOM elements of the web page to the browser, wherein the selection was made by the user based on the sent subset of the plurality of DOM elements of the web page;
  reordering, at the server computer, the processing of the remaining asynchronous data requests corresponding to the webpage based on the user selection;
  sending, by the server computer, the selected DOM element and at least one child of the selected DOM element to the browser based on the reordering; and
  after sending the selected DOM element and the at least one child of the selected DOM element to the browser, sending all remaining DOM elements of the DOM tree of the web page based on the reordering, such that loading of the web page is completed in the browser based on sending all of the remaining DOM elements.

2. The method of claim 1, wherein the method further comprises:
  recalling the user selection for subsequent access to the web page, such that the selected DOM element and at least one child of the selected DOM element are sent to the browser before any other DOM elements of the DOM tree of the web page.

3. The method of claim 1, wherein the user selection is configured as a hot key combined with a mouse scroll-over to select the portion of the web page.

4. The method of claim 1, wherein the user selection is configured as a touch screen gesture to select the portion of the web page.

5. The method of claim 1, wherein the method further comprises:
  completing any prerequisite reference calls after receiving the user selection and before sending the selected DOM element.

* * * * *